Oct. 22, 1935.　　　A. ROBERTSON　　　2,018,230

ROPE

Filed Feb. 20, 1934

Inventor,
Andrew Robertson
M. H. Lockwood
Attorney.

Patented Oct. 22, 1935

2,018,230

UNITED STATES PATENT OFFICE 2,018,230

ROPE

Andrew Robertson, Fairview, Ferryhill, Aberdeen, Scotland, assignor to Robertson's Rope (Patents) Limited, Aberdeen, Scotland Application February 20, 1934, Serial No. 712,163
In Great Britain July 10, 1933

1 Claim. (Cl. 117—53)

This invention relates to improvements in ropes and has for its object the provision of a rope possessing exceptionally good wearing qualities.

According to the invention a rope comprises a core of substantially inextensible material, such as hemp or wire rope, covered with a layer of unvulcanized rubber over and/or in which further strands of the rope are laid up so that the unvulcanized rubber may spue through the interstices between the strands. Further layers may be laid up thereon in a similar manner and the whole may be encased, if so desired, in a layer of partially vulcanized rubber and vulcanized in such manner as to cause the partially vulcanized and unvulcanized rubber to become integral. In some cases a covering of partially vulcanized rubber is interposed between the core and the unvulcanized rubber. The individual strands of the rope may be similarly constructed to said rope, with the omission of the partially vulcanized rubber casing, or they may themselves consist of ordinary rope.

Figure 1:
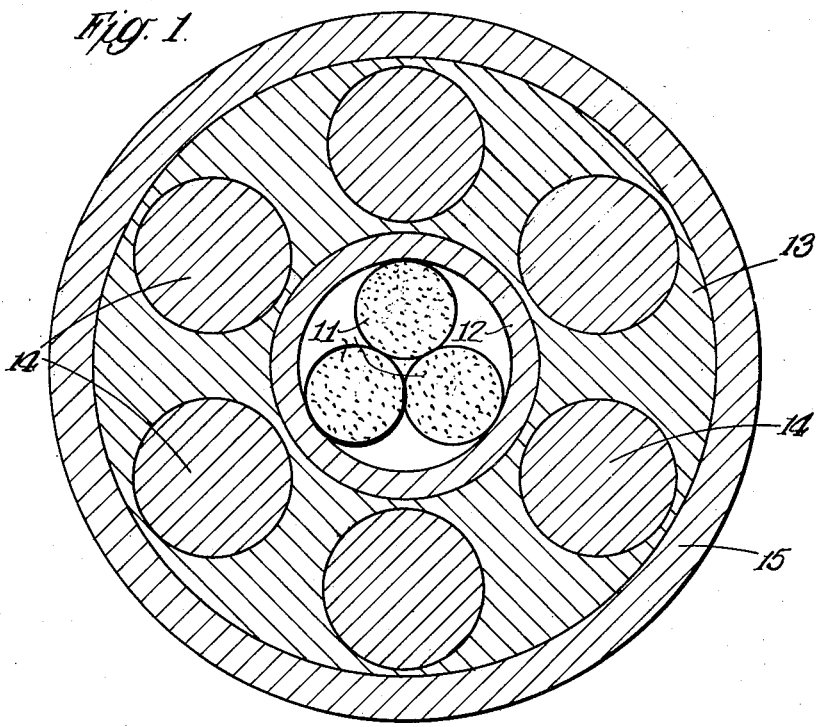
Figure 2:
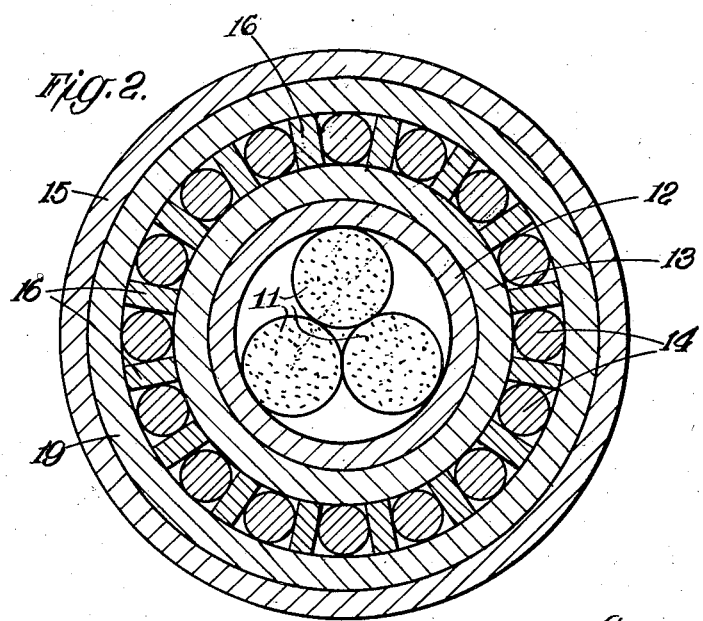

The invention will now be described by way of example with reference to the accompanying drawing in which Figure 1 is a diagrammatic cross section of a rope made in accordance with the invention and Figure 2 is a similar view showing modifications.

Referring to Figure 1 of the drawing the rope consists of a core 11 of hemp rope covered with a layer of partially vulcanized rubber 12 and a layer of unvulcanized rubber 13, over and in which latter, wire 14 is laid up so that the unvulcanized rubber 13 spues through the interstices between the wire. The whole is then covered with a casing of partially vulcanized rubber 15 and vulcanized in such manner as to cause the unvulcanized rubber 13 and the partially vulcanized rubber 12 and 15 to become integral. If desired, the core 11 may be of wire rope.

Figure 2 illustrates modifications of the invention in which, as shown in the drawing, the core 11 of the hemp rope is, as before, covered with a layer of partially vulcanized rubber 12 which is surrounded by a layer of unvulcanized rubber 13. Wire 14 is laid up loosely over said unvulcanized rubber 13 and between adjacent strands of said wire there are interposed strips such as 16 of unvulcanized rubber. A layer of unvulcanized rubber 19 is then applied and the whole is encased as in the previous form of the invention, in a layer of partially vulcanized rubber 15, and vulcanized in such manner as to cause the partially vulcanized rubber 12 and 15, and the unvulcanized rubber between those layers to become integral. It is to be understood that, in those cases where yarn 17 is incorporated, the unvulcanized rubber spues through the yarn and preserves integrity of the rubber.

If desired, further layers, or a series of layers, of unvulcanized rubber, wire, and/or partially vulcanized rubber may be embodied in the rope and the whole vulcanized as hereinbefore described.

The outer casing of rubber 15 may be formed with constrictions or the like if desired, and may be of such shape or configuration as is best adapted for the purpose of its use.

By means of this invention it is possible to produce a rope, at once resilient and strong, while the outer casing of rubber 15 is restrained against undue movement relatively to the wire 14 of the rope by reason of its intimate connection with the soft rubber. Moreover, the rubber inhibits corrosion by excluding moisture and eliminates the detrimental effects of friction upon the strands of the rope.

I claim:—

A rope comprising strands of substantially inextensible material forming a core, an inner layer of vulcanized rubber enclosing said core, a plurality of rope strands spaced from each other upon said vulcanized layer, a layer of unvulcanized rubber upon said inner vulcanized layer surrounding and embedding said rope strands and an outer layer of vulcanized rubber enclosing said unvulcanized layer and the rope strands therein, the inner and outer vulcanized layers being united to the unvulcanized layer by partial vulcanization.

ANDREW ROBERTSON.